L. SMITH.

PROOF AND TRANSFER PRESS.

APPLICATION FILED AUG. 2, 1921.

Reissued Oct. 31, 1922. 15,481.

6 SHEETS—SHEET 1.

Inventor:-
LOUIS SMITH
by: William Stoll Atty.

L. SMITH.

PROOF AND TRANSFER PRESS.

APPLICATION FILED AUG. 2, 1921.

Reissued Oct. 31, 1922. 15,481.

6 SHEETS—SHEET 2.

L. SMITH.
PROOF AND TRANSFER PRESS.
APPLICATION FILED AUG. 2, 1921.
Reissued Oct. 31, 1922.
15,481.
6 SHEETS—SHEET 3.
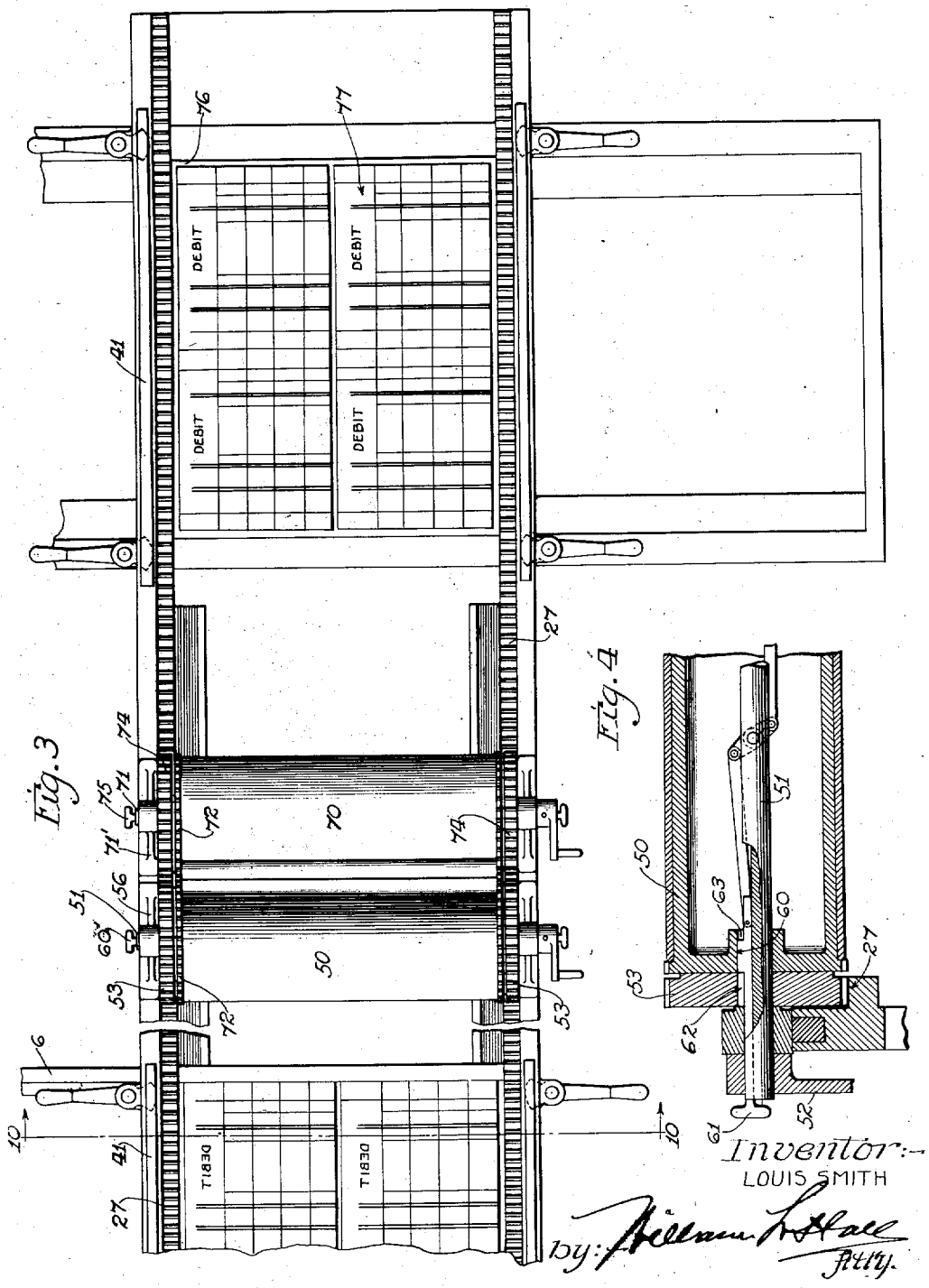

L. SMITH.

PROOF AND TRANSFER PRESS.

APPLICATION FILED AUG. 2, 1921.

Reissued Oct. 31, 1922. 15,481.

6 SHEETS—SHEET 4.

Inventor:
LOUIS SMITH

By William L. Hall, Atty.

L. SMITH.
PROOF AND TRANSFER PRESS.
APPLICATION FILED AUG. 2, 1921.
Reissued Oct. 31, 1922.
15,481.
6 SHEETS—SHEET 5.
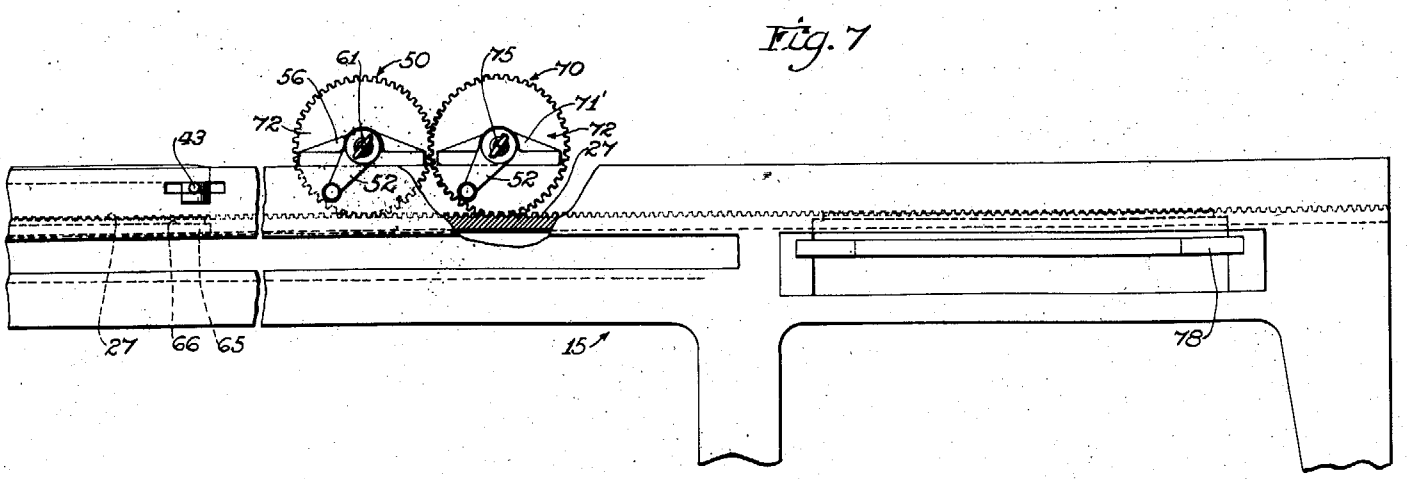
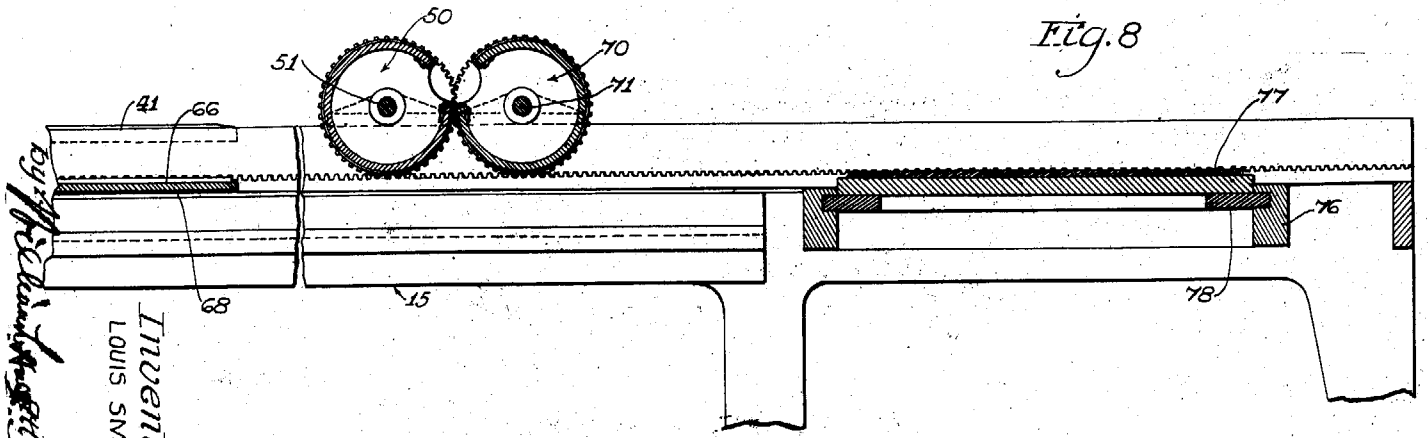
Inventor:
LOUIS SMITH
By his Attorney

L. SMITH.

PROOF AND TRANSFER PRESS.

APPLICATION FILED AUG. 2, 1921.

Reissued Oct. 31, 1922.

15,481.

6 SHEETS—SHEET 6.

Inventor:-
LOUIS SMITH
by:- William L. Hage
Atty.

Reissued Oct. 31, 1922.

Re. 15,481

UNITED STATES PATENT OFFICE.

LOUIS SMITH, OF CHICAGO, ILLINOIS, ASSIGNOR OF ONE-HALF TO WILLIAM L. HALL, OF CHICAGO, ILLINOIS.

PROOF AND TRANSFER PRESS.

Original No. 1,312,366, dated August 5, 1919, Serial No. 254,151, filed September 14, 1918. Application for reissue filed August 2, 1921. Serial No. 489,376.

*To all whom it may concern:*

Be it known that I, LOUIS SMITH, a citizen of the United States, and a resident of Chicago, in the county of Cook and State of Illinois, have invented certain new and useful Improvements in Proof and Transfer Presses; and I do hereby declare that the following is a full, clear, and exact description thereof, reference being had to the accompanying drawings, and to the characters of reference marked thereon, which form a part of this specification.

This invention relates to novel proof and transfer presses for taking proofs from forms suitably locked on a bed for proving and registering the forms and thereafter, without removing the forms from the bed after the same are in register, transferring the impressions from the forms direct on printing plates for lithographic or offset presses. The press is designed for making either positive or negative transfer printing plates or elements for lithograph or offset presses from zinc, aluminum, stone, rules, type, or cuts in one operation of the transfer element, in one or more colors. One or more forms can be imposed on a printing plate by direct transfer from rules, type, or cuts, to zinc plate, aluminum, or stone.

A purpose of the invention is to provide a novel construction, wherein a proof and a transfer roller can be so associated with a bed on which the forms are locked and a bed on which the transfer plates, stones, or other elements, are supported that the forms may be first proved up and registered by running the proof roller thereover, and thereafter the impressions from the forms can be directly transferred therefrom by a transfer roller or rollers to a printing element such as zinc printing plates, aluminum, or stone for lithograph or offset work, thus providing means in one simple press for successively proving and transferring the work, which may be employed for lithograph work only or for offset work only, and which may be used also as a proving press for composing room.

Another object of the invention is to provide a novel press of this character wherein a double bed that supports the printing forms may be adjusted with respect to the proof roller and to the transfer roller or rollers, so as to compose the printing forms on the rollers or to superimpose them thereon, and to also so adjust the press to forms of different sizes and subjects locked on the bed, such as ruled sheets, color work, and the like. Such adjustment of the bed may be effected either in a direction parallel to the axes of the proof or transfer rollers or in a direction transverse thereto or the adjustment may be in both directions.

Another object of the invention is to provide novel means for so adjusting the bed.

A further object of the invention is to provide means for operating the rollers, constructed and cooperating with means for elevating effective faces of the rollers above the forms and printing elements so that said rollers may be moved longitudinally of the bed without contact with certain of the forms or printing plates or elements at times when no contact is desired, and in contact therewith when such contact is desired.

Another object of the invention is to provide a novel arrangement of sectional tracks for supporting the rollers, in connection with means for giving movement to the rollers bodily of the bed and printing elements, so constructed and arranged as to elevate the sectional tracks to lift the rollers above the forms and printing elements at certain parts of the travel of the rollers whether or not the rollers be at such time rotated.

Another object of the invention is to provide a novel arrangement of transfer rollers whereby the impression from the printing forms may be either transmitted directly to a printing plate, or the like, as a negative impression or directly transferred to a second roller for direct positive transfer to a printing plate for an offset press, or may be directly transferred from a transfer roller to another to reverse the final impression.

Other objects of the invention are to otherwise improve and simplify presses, and the invention consists in the combination and arrangement of the parts shown in the drawings and described in the specification, and is pointed out in the appended claims.

In the drawings:

Figure 3 is an enlarged rear end of the press with parts broken away.

Figure 4 is a detail of one of the transfer rollers on the line 4—4, showing means for locking the rollers to rotate with their traveling gear and to permit the gear to rotate without causing the roller to rotate.

Figure 7 is an enlarged side view of the rear end of the machine.

Figure 8 is a longitudinal section thereof taken on the line 8—8 of Figure 1.

Figure 1:
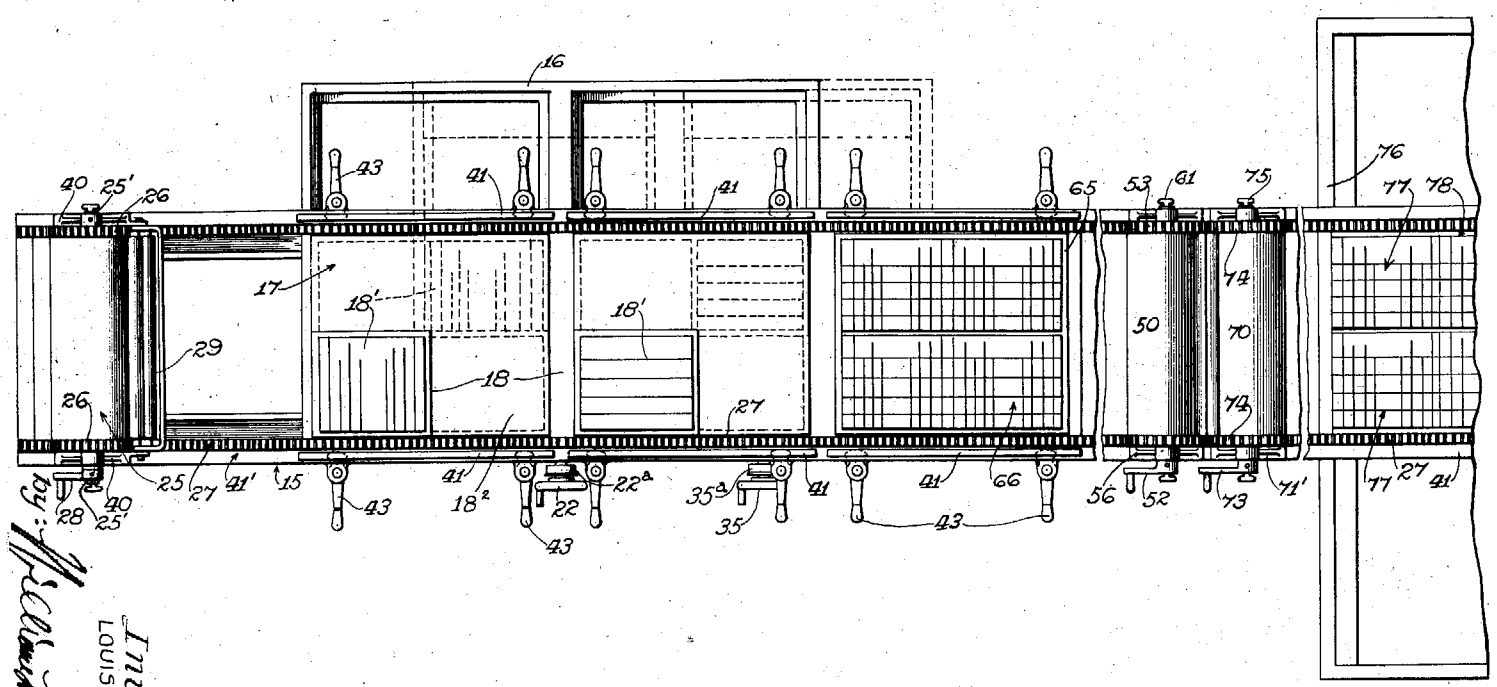
Figure 1 is a plan view of a proof and transfer press embodying my invention.

The frame 15 of the machine may be made of any suitable or convenient shape to properly support the elements of the machine and their bearings, and is shown as comprising a horizontal platform supported on legs or standards. The general structure has an extension 16 for a purpose to be hereinafter described. Supported on said frame is a movable or adjustable printing form supporting bed 17 and also a bed 65 to support a printing element 66. The movable or adjustable bed, as herein shown, is made of a width equal substantially to that of the machine frame, and of a length to constitute a double or two part bed with the bed parts longitudinally spaced on the machine frame, with each bed part of such length relatively to the effective faces of the proof and transfer rollers that imprints from different forms supported on the bed parts may be applied on a proof or transfer roller, by proper adjustment of the bed, to compose simple or superimposed impressions from the forms on the transfer roller, from whence said impressions are applied to a printing element. The printing plate supporting bed 65 is above the level of the bed 17 so that the latter in its longitudinal adjustment may pass partly beneath the bed 65, as indicated in dotted lines in Figure 1, and so that the inking rollers may not clash with the bed 65. The frame 15 is also provided at one end with a transverse extension 76 to support an adjustable bed 78 for printing plates 77. When such an adjustment is arranged for, the bed 17 may be termed a double bed in that it is arranged to support two or more spaced forms which are adapted to be registered in such relation as to produce ultimate compositions, whether cross lines or other lines.

For convenience and certainty, the forms supported on the bed 17 are herein termed printing forms, however individually made; the plates 66 supported on the bed 65 are termed negative printing elements, and the plates 77 supported on the bed 78 are termed positive printing elements. These terms are not, however, intended as limiting terms but are descriptive of the present illustration of the invention.

Said bed 17 supports frames or chases 18 in which are locked in any suitable manner the form 18′ best shown in Figure 1. The particular forms shown in Figure 1 may be the down and cross line forms that are composed, proved, and properly registered for printing cross ruled sheets in accordance with the method disclosed in my prior United States Letters Patent Number 1,210,862, granted January 2, 1917. The cross ruled forms made in accordance with the aforesaid method, may bear in addition to the down and cross lines, such printing as may be desired, and as indicated in Figure 3. As shown in Figure 1, the forms 18′ are of dimensions to occupy allotted rectangular spaces $18^2$ on the bed, and, as herein shown, the transverse width of each space is equal to one-half the length of the proof and transfer rollers and the other dimension of said space is equal to one-half of the length of the effective circumference of the rollers.

Figure 2:
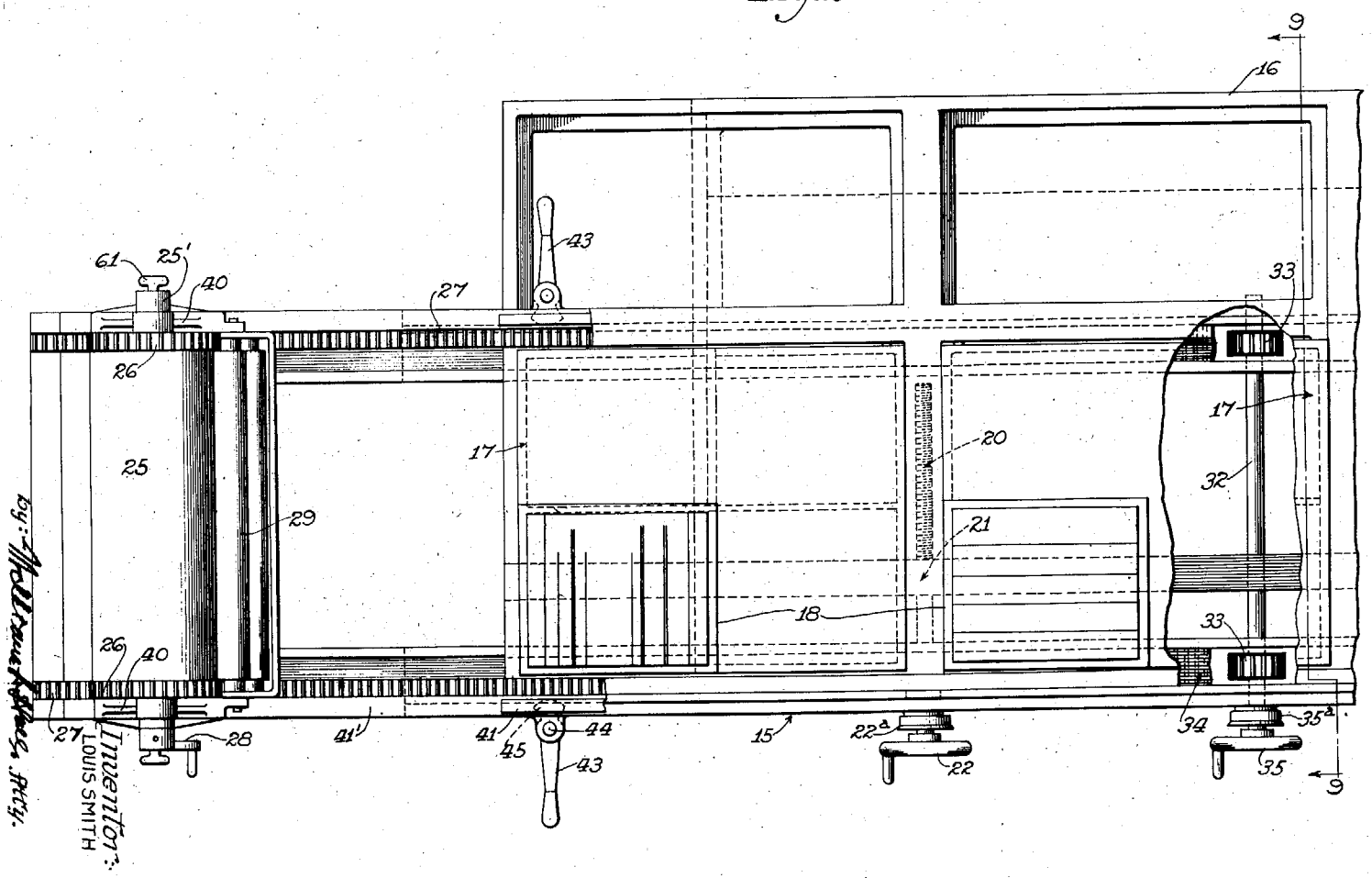
Figure 2 is an enlarged plan view of the front end of the press with parts broken away.

Assuming that proofs are to be made and registered of down and cross lines of a cross ruled form, as indicated in Figures 1 and 2, after proofs have been taken and registered from the full line positions of the forms shown in Figure 1, on the proof roller and the impressions transmitted to a transfer roller to occupy the same position thereon as they occupy on the proof roller, the bed supporting said forms can be shifted so that the forms occupy some other positions relatively to the proof and transfer rollers, but always in register, some of which positions are taken by other parts of the proof roller and the lines then are picked up from the printing forms by other parts of the transfer roller to be later transferred to the printing element.

If desired, however, other forms, such as plates, rules, type, or cuts of the same or different colors may be locked on the bed to constitute smaller forms, in which event it is necessary to adjust the movable bed a larger number of times in each composition on the transfer roller so as to bring the forms in proper registration with the desired longitudinal and circumferential areas of the proof and transfer rollers.

After the desired number of forms have been completed or collated on a transfer roller, the imprint therefrom to a printing plate or element is made in one operation of the roller.

Figure 5:
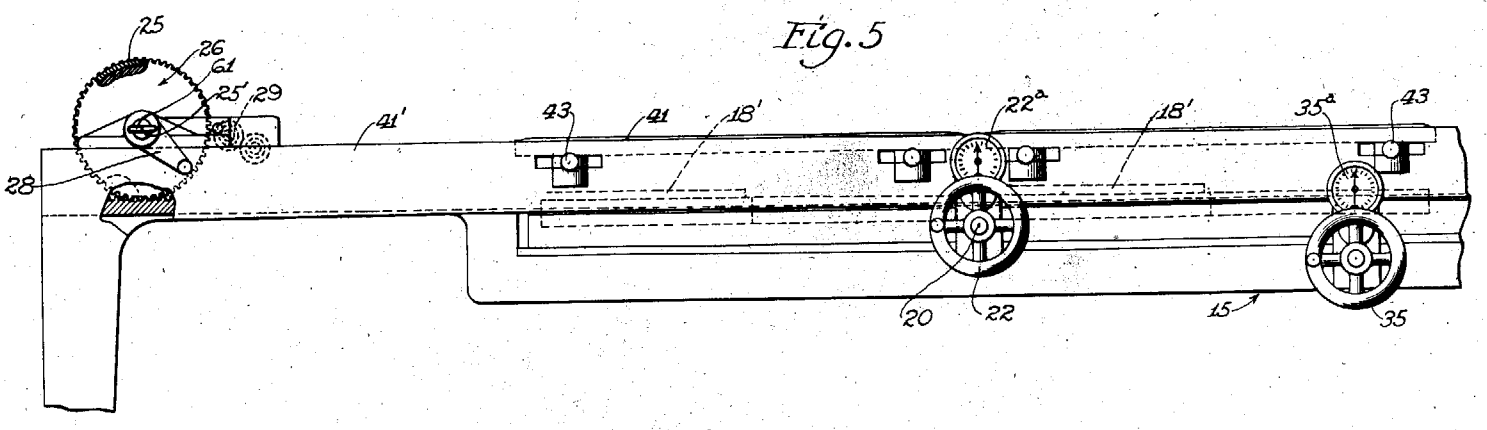
Figure 5 is an enlarged side elevation of the front end of the machine.
Figure 9:
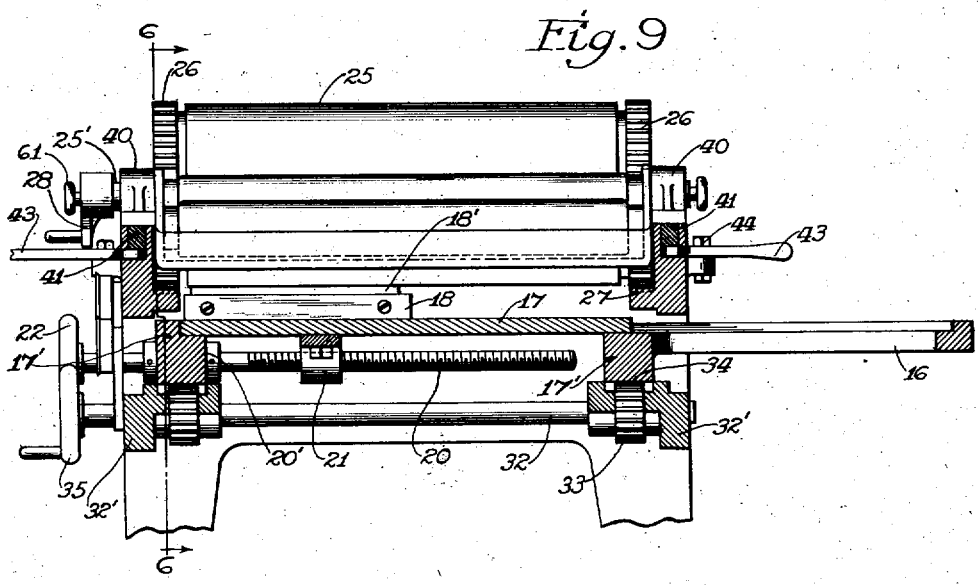
Figure 9 is a cross section on the line 9—9 of Figure 2.
Figure 10:
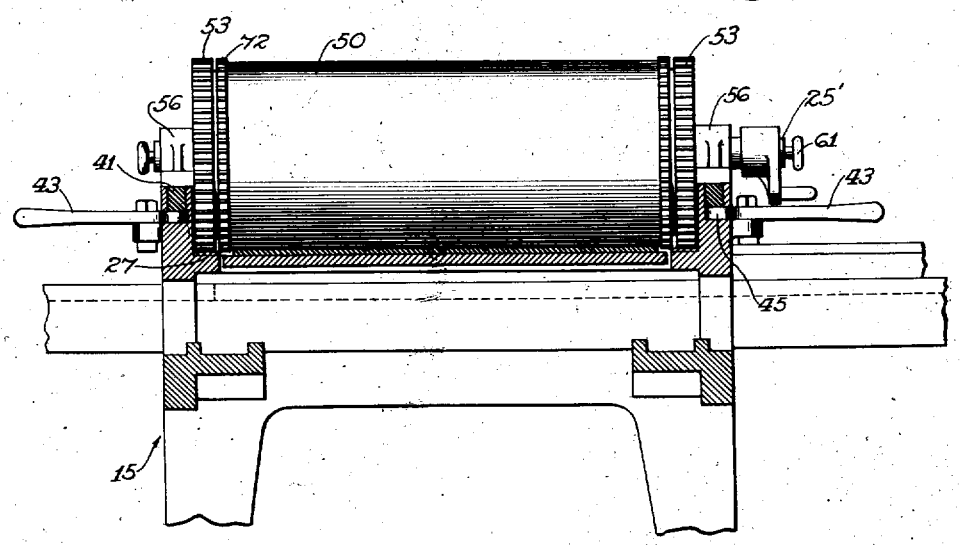
Figure 10 is a cross section on the line 10—10 of Figure 3.

The said bed 17 is supported to shift laterally on a table 17′ that is movable longitudinally on the frame in a manner hereinafter described. The means herein shown for so laterally adjusing the movable bed on the table comprises a threaded shaft 20 which is rotatably mounted in a suitable bearing 20′ on said table and is threaded through a nut 21 that depends from the bed 17 (Figure 9). Said shaft is provided with a hand wheel 22, and a graduated dial and cooperating pointer 22a (Figures 2 and 5) may be associated with said shaft so as to facilitate the lateral registrations of the forms relatively to the proof and transfer rollers. The extension 16 of the table 17′ is provided to support the bed 17 when the latter is adjusted to occupy the lateral position indicated by the dotted lines in Figure 1.

The means for adjusting the bed 17 longitudinally of the frame to register the forms to predetermined peripheral surfaces of the proof roller 25 comprise a rotative shaft 32 that is disposed transversely of the frame in rear and below the plane of the shaft 20 and is mounted in suitable bearings in the frame members 32′. Said shaft 32 carries near its ends pinions 33 which are adapted to mesh with downwardly facing teeth of racks 34 of the table 17′. The shaft 32 is provided at one end with a hand wheel 35 by which it is rotated, and a graduated dial 35ᵃ and a cooperating pointer may be associated with the shaft to measure the rotations of the shaft and thereby facilitate proof and registration of the forms relatively to the proof and transfer rollers longitudinally of the latter.

The proof roller 25 is located at the forward end of the frame. It is supported on a shaft 25′ that is rotatively mounted in bearings carried by bearers 40 which are in turn, supported on tracks 41, 41′, the latter fixed relatively to the frame and extending longitudinally of the frame, one set at each side thereof. The former can be vertically adjusted by means and for a purpose hereinafter described. 26, 26 designates spur gears which are fixed to said shaft 25′ and mesh with the upwardly facing teeth of longitudinal racks 27, 27 that are supported on the frame 15 at the sides thereof and within the tracks 41, 41′, whereby, on rotation of the proof roller, the latter can be caused to rotate on its axis and also to be carried bodily lengthwise of the adjustable bed. The said proof roller is rotated on its axis and caused to move along the frame by means of a crank 28 fixed to the shaft 25′. The track sections 41 41′ are adapted to be raised in any suitable or preferred manner to lift the proof roller and the transfer roller out of contact with the forms or certain of them and of the printing element, as will hereinafter more fully appear. 29 designates a group of inking rollers of any suitable type associated with an ink fountain and adapted to travel over the forms with the proof roller when the latter is caused to bodily pass over the bed, to ink said forms in both directions of travel of the roller.

Figure 6:
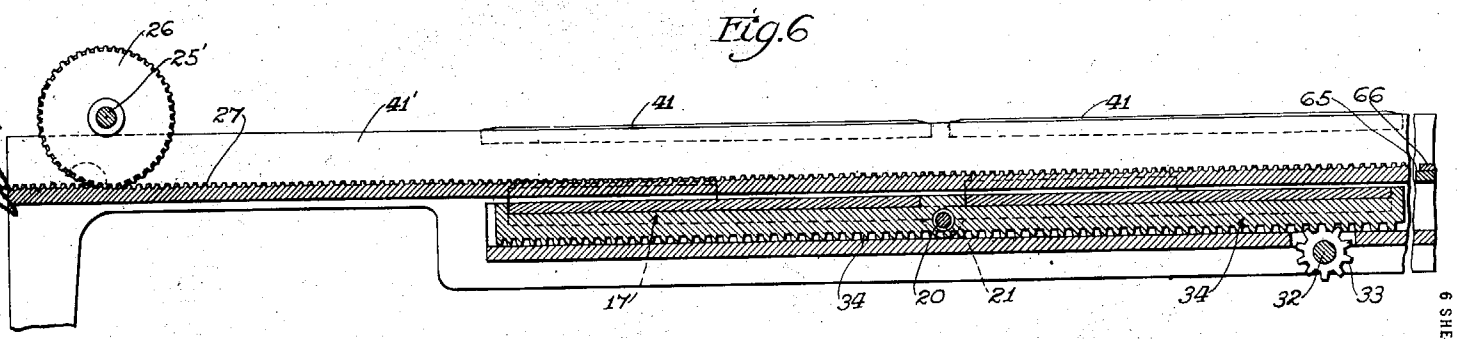
Figure 6 is a longitudinal section thereof on the line 6—6 of Figure 9.

Through the coaction of the adusting shaft 20 and nut 21 of the bed, on the one hand, and the shaft 32 and the pinions 33 and racks 34 of the table, on the other hand, it will be observed that the double bed 17 may be shifted either laterally or longitudinally of the frame to effect desired registration of the forms relatively to the proof and transfer rollers and to adjust the press forms of different sizes. The threads of the shaft 20 and the teeth of the pinion 33 and racks 34 will be made of such pitch as to give a desired delicacy of adjustment of the bed in either direction, and the dials 22ᵃ and 35ᵃ are graduated to indicate such adjustments. It will be understood that the pointers of said dials are geared in any suitable manner to the shafts 20 and 32 to cause the pointers to sweep over the dials as said shafts are turned to adjust the bed. Such registration of the bed relatively to the proof and transfer rollers may be made by other known and suitable devices within the spirit of the appended claims. The shoes or bearers 40, in which the shaft 25′ of the proof roller is mounted bear upon the fixed tracks 41′ of the frame at the front end of the press or outwardly beyond the form bed when the proof roller is in its inoperative or retracted position, and when said roller is moved over the forms 18′ to pick up the proof therefrom said bearers 40 are supported by the sectional tracks 41. When the forms are of such size as to occupy less area than all of the bed, or when proving and registering, or transferring multi-color forms on and from the bed, respectively, it may be necessary or desirable in some parts of the travel of the proof roller over the forms to lift the same away from or out of contact with certain of the forms. This can be done when a proof or transfer roller does not travel entirely across the form bed. Such lifting of the proof roller may be effected by raising the sectional tracks 41 and said tracks may be raised in any suitable or approved manner. The means herein shown for raising the tracks are made as follows:

The said track sections are provided at their ends and on their under sides with shallow cam faces adapted to be engaged by the cam inner arms 45 of levers 43 that are pivoted at 44 to the machine frame. When the levers 43 are in their outstanding positions or normal to the sides of the frame, as shown in Figure 3, the arms 45 are engaged with said cams and serve to raise the tracks to positions indicated in Figures 5 and 6. When the proof roller is located abreast said tracks and the bearers 40 are supported on the raised tracks, said bearers and the proof roller are raised so as to lift the roller above the forms. When the levers 43 are swung at oblique angles to the positions indicated in Figures 1, 2, 5, and 7, the tracks 41 descend to the level of the fixed tracks 41′ of the frame to bring the proof roller in contact with the forms on the bed, as desired. It will be understood that the required lift is slight, not sufficient to demesh the gears and racks.

50 designates a transfer roller, the shaft 51 of which is mounted in suitable bearings carried by beareres 56 that are adapted to bear on the fixed tracks 41′ of the frame, or upon the sectional raisable and lowerable track sections 41, depending upon the position of said roller on the frame. The shaft 51 of said transfer roller is adapted to be rotated on its axis through the medium of a hand crank 52 attached to the said shaft. At the ends of the transfer roller are spur gears 53 which mesh with the upwardly facing teeth of the rack 27, above referred to, whereby when the crank 52 is turned, and therethrough the transfer roller 50, the engagement of said gears 53 with the tracks 27 causes the transfer roller 50, not only to rotate on its axis, but also to be moved bodily lengthwise of the beds 17 and 65. Thus the transfer roller may be moved over the forms 18′ after the same have been proven and registered and said transfer roller may be thereafter moved backwardly over the bed 17 and to the bed 65 to transfer the impressions received thereby on the printing elements 66 supported on the fixed bed. When said transfer roller 50 is being moved forwardly over the fixed bed 65, the track sections 41 can be elevated to lift said roller out of contact with the printing element 66, by the means before described, and when the roller is returned to said printing element after receiving the transfer from the forms 18′, the track sections can be depressed to cause the impression received by the transfer roller to be transferred to said printing element. Also the track sections 41 may be thus raised to lift the transfer roller out of contact with any one of the forms 18′ not to be transferred in any particular operation of the machine, or the lifting may occur in other directions of travel of the transfer roller.

If the plates 66 on the bed 65 are to be used as lithograph plates on a lithograph press, the transfer of the forms on said plate or element will be negative or the same as shown on the forms 18′, and said plates after receiving the transfer from the roll 50 are removed to be prepared for the lithograph press and used as printing plates in the usual way.

At times it is desirable to move the transfer roller 50, as well as the proof roller 25, and the transfer roller 70, hereinafter described, bodily lengthwise of the bed without turning on the axes thereof. This may be effected in any suitable or known way. One form of means for causing the roller 50 to be thus moved longitudinally of the bed without rotating it on its axis is shown in Figure 4. As herein shown, the shaft 51 of the transfer roller is grooved to receive keys 60, 60 having hand pieces 61 exposed at the ends of the shaft, whereby the keys may be shifted in the keyways. The heads of the transfer rollers 50 are provided with keyways 63 and the spur gears 53 are also provided with keyways 62. When the broad inner ends of the keys 60 are engaged partially in the keyways 63 of the transfer roller, said transfer roller is locked to the gears 53 so that when the shaft 51 is rotated, through application of power to the crank shaft 52, the transfer roller will be caused to rotate on its axis and also to be moved bodily longitudinally over the bed through the coaction of the spur gears 53 and the racks 27. When the keys 60, 60 are shifted so that their broader inner ends lie wholly within the keyways 62 of the spur gears 53, said gears may rotate with the shaft 51, without, however, transmitting rotation to the transfer roller 50. In the latter adjustment of the parts the transfer roller may be shifted bodily, through the coaction of the gears 53 and rack 27 with respect to the bed without turning on its axis and at a time when the gripping recesses of the rollers are downmost. The keys may be connected in any suitable manner for mutual operation, as, for instance in the manner shown in Figure 4.

When it be desired to transfer the impressions from the transfer roller 50 for positive impression to printing elements for offset press work, the impression from the transfer roller 50 is shown as transferred directly to a second transfer roller 70 that is so mounted on the frame that said transfer rollers 50 and 70 may be geared together to rotate in peripheral contact and thereby transfer the impression from one roller to the other, to be by the latter printed on another printing element.

The said transfer roller 70 is mounted on a shaft 71 which is rotatively supported on and is carried by bearers 71′ that are supported directly on the fixed tracks 41′ of the frame. The shaft 71 of the transfer roller 70 is provided with a crank 73 by which the latter roller is turned on its axis, and through coaction of spur gears 74, 74 at the ends thereof with the racks 27 before described, said transfer roller 70 may be caused to be moved bodily over and in contact with the printing element 77 to transfer the impression received from the roller 50 to the positive printing elements for offset work.

In order to cause the transfer rollers 50 and 70 to be rotated in contact with each other and at equal peripheral speeds, said rollers are connected by suitable gears, at their ends, as for instance, by meshing gears 72, as best shown in Figure 3, operative when their gears 74 and 53 are inoperative. When the transfer rollers 50, 70 are to be rotated in peripheral contact with each other to transfer an impression from one to the other, the broad, inner ends of the keys 60, 60′ of the transfer roller 50 may be forced inwardly wholly into the keyways 63 of the transfer roller 50, whereby said roller is released from the spur gears 53 so that the roller may be rotated on its axis without, however, causing said roller to move bodily relatively to the frame. The transfer roller 70 may be likewise provided with controlling keys 75, by which said latter roller may be also released from its spur gears 74 so that both said rollers 50 and 70 may be caused to rotate on their axes and in peripheral contact with each other without tendency of moving the rollers bodily relatively to each other, this occurring when an impression is to be transferred from the primary transfer roller 50 to the secondary transfer roller 70, and the impression thereafter transferred from the latter roller to the printing element 77.

In the operation of the machine, the proof roller can be turned on its axis during the time it is being moved bodily either rearwardly or forwardly over the forms to receive the proof impressions therefrom, and can be released from its gears to move in the other direction so as to be carried bodily in the other direction over the forms without turning on its axis. Said proof roller can return to its normal or inoperative position while the interrupted or clamping recess thereof faces downwardly, or when one of the pairs of the tracks 41 are raised. The transfer roller 50 can be rotated on its axis when traveling either forwardly or rearwardly over the printing forms 18′ to pick up the impressions therefrom, and when traveling over the movable double bed can be released from its gears so as not to turn on its axis, and during the latter movement the clamping or interrupted recess thereof can face downwardly, or the said transfer rollers may be lifted when passing over portions of the form bed. The secondary transfer roller 70 can turn on its axis when moving either rearwardly or forwardly over the printing element 77 and will be disengaged from its gears and return forwardly to its inoperative position without rotating on its axis and with its clamping clearance recess disposed downwardly.

The means herein shown for releasing the gears from the proof and transfer rollers are merely illustrative as one form of such means, but it will be understood that any preferred or known form for controlling said movements to cause them to properly register with the form and plate may be employed. In event that the key means herein shown be employed to effect alternate connection and disconnection of the rollers, the frame may be provided with any suitable cams to cooperate with the keys, or in place of the keys known forms of ratchet release and coacting projections may be employed.

In further reference to the operation of the press it may be stated that when two or more forms are used on the adjustable double bed to be proved and registered and transferred to the transfer roller, the form at the lower, left hand side of the bed, shown in Figure 1, will, after it has been proved and registered, remain fixed, it being, so to speak, a key form by which to register other forms, that may be used on another part of the double bed. For instance, the down line form of Figure 1 is the key form. After it has been registered and proved, the other or cross line form can be registered and proved from the down line form, being located in the same relative position in the corner of the other compartment of the bed. When both forms are locked up and registered, the transfer roller is brought forward to pick up the superimposed impression lines from the registered forms and is then carried backwardly to its starting position without being brought into contact with a printing element. The double bed can then be adjusted in the manner indicated in dotted lines in Figure 1 until all the superimposed impressions are on the transfer roller, after which the filled transfer roller can be lowered into contact with a printing element and the objects collated on the transfer roller laid or transferred in one operation thereof on a printing element. If more than two objects are to thus be collated on the transfer roller another object corresponding in position to the cross line object in Figure 1 will be substituted for the object before occupying its place, and before a transfer has been made of any of the theretofore collated matter from the transfer cylinder. Thereafter the third object will be registered and proved relatively to the key form or object, whereupon the third object will be picked up and collated on the transfer roller in the manner before described to prepare the transfer roller to transfer the entire collation on a printing element in one operation of the latter roller. As many superimposed object forms as desired may be thus prepared and picked up by the transfer roller before final printing or transfer impression operation of the latter.

The transfer roller may be shifted to either of the printing element beds for direct transfer, or the transfer from the roller 50 can be made through the cooperating transfer roller 70. It has been assumed that the forms on the double bed 17 are negative but if said forms be positive, the opposite order of impression will appear on the printing element 77. It will, of course, be understood that the length of the parts of the dobule bed, the printing element beds, and the intervening spaces will be so proportioned to fix the positions to the effective surface of the rollers as of the rollers relative to the forms and plates for proper proving, registering, and printing.

So far as the structural details of the various mechanisms by which to operate the proof and transfer rollers and by which to elevate and depress the rollers at the desired times, and otherwise, adapt the effective surfaces of the rollers to the forms and printing elements and by which to adjust the movable beds 17 and 78 are concerned, such details may be considerably varied from those shown, said details being merely illustrative rather than limiting. It is believed, however, that the combination of the proof and transfer rollers operating on a single frame in connection with a movable or adjustable double printing form bed and with a bed or beds for supporting the printing elements to receive impressions from the transfer roller or rollers is novel, and such combination and the general adaptation of the means to effectuate said result are herein broadly claimed.

I claim as my invention:

1. A proof and transfer press comprising an adjustable bed adapted to support a printing form, a bed adapted to support a printing element, a proof roller travelable over the printing form, and a transfer roller travelable across the printing element and over the printing form to receive an impression from said form and to transfer said impression to the printing element.

2. A proof and transfer press comprising an adjustable double bed adapted to support two printing forms whose objects are to be superimposed in printing, a bed adapted to support a printing element, a proof roller travelable over the printing forms, and a transfer roller travelable across the printing element and over the printing forms to receive a superimposed impression from both said forms and to transfer said impressions to the printing element.

3. A proof and transfer press comprising an adjustable bed adapted to support a printing form, a bed adapted to support a printing element, a single frame to support said beds, a proof roller travelable over the printing form, and a transfer roller travelable across the printing element and over the printing form to receive an impression from said form and to transfer it to the printing element.

4. A proof and transfer press comprising an adjustable bed adapted to support a printing form, a bed adapted to support a printing element, a single frame to support said beds, a proof roller travelable over the printing form, a transfer roller travelable across the printing element and over the printing form to receive an impression from said form and to transfer it to the printing element, and an inking roller connected to be movable with said proof roller.

5. A proof and transfer press comprising an elongated bed adapted to support a printing form, a bed adapted to support a printing element, a proof roller travelable over the printing form, a transfer roller travelable across the transfer element and over the printing form to receive an impression from said form and to transfer said impression to the transfer element, and means whereby the proof and transfer rollers may move over the printing element and form without contact of the effective faces of said rollers therewith.

6. A proof and transfer press comprising an adjustable bed adapted to support a printing form, a bed adapted to support a printing element, a single frame to support said beds, a proof roller travelable over the printing form, a transfer roller travelable across the printing element and over the printing form to receive an impression from said form and to transfer said impression to the printing element, and means to adjust said movable bed relatively to said rollers.

7. A proof and transfer press comprising an elongated bed adapted to support a printing form, a bed adapted to support a printing element, a proof roller travelable over the printing form, a transfer roller travelable across the transfer element and over the printing form to receive an impression from said form and to transfer said impression to the transfer element, and means to lift the transfer roller out of contact with the printing element and printing form.

8. A proof and transfer press comprising a double bed adapted to support printing forms, a bed adapted to support a printing element, a proof roller travelable over the printing forms, a transfer roller travelable across the printing element and over the printing forms to receive impressions from said forms and to transfer said impressions to the printing element, and means to support said form bed constructed with means to adjust the latter bed laterally and longitudinally relatively to said rollers.

9. A proof and transfer press comprising a proof roller, a transfer roller and an adjustable and a fixed bed common to said rollers.

10. In combination, a double adjustable form bed and a printing element bed, a proof and a transfer roller travelable thereover, and means to adjust said form bed relative to both said rollers.

11. A proof and transfer press comprising a movable form bed, a printing element bed, rotatable proof and transfer rollers, and means to cause the said rollers to rotate on their axes and to travel over said beds.

12. A proof and transfer press comprising an adjustable form bed, a printing element bed, a proof roller, with means to rotate it and to cause it to travel over the form bed, and a transfer roller with means to rotate it and to cause it to travel over said beds toward and from the proof roller.

13. A proof and transfer press comprising an adjustable form bed, a printing element, a proof roller, with means to rotate it and to cause it to travel over the form bed, a transfer roller with means to rotate it and to cause it to travel over the said bed toward and from the proof roller, tracks on which said rollers are supported, and means to raise and lower said tracks.

14. A press comprising a frame, a printing form bed supported thereon, means to adjust said bed transversely and longitudinally of the frame, a proof roller travelable over said bed, and raisable and lowerable tracks on which said proof roller is supported.

15. A proof and transfer press comprising a frame, a printing form bed supported thereon, means to adjust said bed transversely and longitudinally of the frame, and proof and transfer rollers cooperating with said bed.

16. A proof and transfer press comprising a frame, a lateral bed supporting extension, a bed supported on the frame, with means to adjust it laterally and longitudinally of the frame, a proof roller supported on said frame, and means to cause said roller to travel over said bed.

17. A proof and transfer press comprising a frame, a bed supported thereon, tracks at the sides of the frame, proof and transfer rollers, bearers on which said rollers are rotatively supported and adapted to travel on said tracks, means to rotate said rollers, and means to cause them to separately travel over said bed.

18. A proof and transfer press comprising a frame, a bed supported thereon, tracks at the sides of the frame, proof and transfer rollers, bearers on which said rollers are rotatively supported and adapted to travel on said tracks, means to rotate said rollers, means to cause them to separately travel over the bed, said tracks being sectional, and means to raise and lower the track sections.

19. A proof and transfer press comprising a frame, a bed supported thereon, tracks at the side of said frame, proof and transfer rollers, bearings therefor travelable on said tracks, racks on the frame parallel to said tracks, gears on the rollers meshing with said tracks, and means to separately rotate said rollers.

20. A proof and transfer press comprising a frame, a bed thereon, proof and transfer rollers, rotatively supported on said frame, racks on said frame, gears on said rollers to mesh with said racks, and means to raise and lower said rollers relatively to said bed.

21. A proof and transfer press comprising a frame, a bed supported thereon, tracks at the side of said frame, proof and transfer rollers, bearings therefor travelable on said tracks, racks on the frame parallel to said tracks, gears on said rollers meshing with said racks, means to separately rotate said rollers, and means to releasably lock the roller gears to said rollers whereby said gears may rotate independently of or together with said rollers as desired.

22. In combination, a support for a printing form and a bed for a printing element, two transfer rollers, one of which is travelable over and in contact with said printing form and is movable in peripheral ink transfer contact with other roller, means to rotate said rollers while in said contact, and means whereby one of said rollers is rotated in transfer contact with the printing element to reverse the object from the printing form.

23. A proof and transfer press comprising a frame adapted to support a printing form near one end thereof and to support two sets of spaced printing elements at its other end, one to receive negative transfers, and the other to receive positive transfers, a proof roller travelable over the printing form, negative and positive transfer rollers normally between said printing elements, the former of which is travelable across the negative printing element and over the printing form, and means whereby said transfer rollers may be rotated in peripheral contact to transfer impressions from the negative transfer roller to the positive roller, said positive transfer roller being travelable over one of the printing elements to transfer positive impressions thereon.

24. A proof and transfer press comprising a frame adapted to support a printing form near one end thereof and to support two sets of spaced printing elements at its other end, one to receive negative transfers, and the other to receive positive transfers, a proof roller travelable over said printing form, negative and positive transfer rollers normally between said printing elements, the former of which is travelable across the negative printing element and over the printing form, means whereby said transfer rollers can be rotated in peripheral contact to transfer impressions from the negative transfer roller to the positive roller, said positive transfer roller being travelable over one of the printing elements to transfer positive impressions thereon, and a support for the latter printing element, combined with means for adjusting said support.

25. A proof and transfer press comprising a frame, a proof roller, a bed beneath the same adapted to support a printing form, means to support a printing element and transfer means to receive impressions from the printing forms and constructed with means to either transfer said impressions as negative transfers on said printing element or as positive transfers thereon.

26. In combination with a support for a printing form and a transfer element, of two transfer rollers, one travelable over the printing form to receive impressions thereon, with means to cause said rollers to rotate in peripheral contact to transfer the impression from one roller to the other, and means whereby the impressions are transferred from the latter roller to the transfer element.

27. A proof and transfer press comprising a frame, an adjustable bed thereon, proof and transfer rollers rotatively supported on said frame, racks extending longitudinally of the frame, and gears on said rollers separately meshing with said racks.

28. A machine for producing printing elements comprising a frame, a double bed thereon to receive forms whose imprints are ultimately printed in superimposed relation, a support for a printing element, proof and transfer elements movable over and adapted for controllable contact with the printing forms, with means to adjust said bed, means cooperating with said proof element, to prove and register the forms on the double bed, and other means operative to collate superimposed impressions on the transfer element, said transfer element operating to transfer the collated impressions on the printing element in one operation of said transfer element.

In testimony whereof I claim the foregoing as my invention, I hereunto append my signature at Chicago, Illinois, this 30th day of July, 1921.

LOUIS SMITH.